C. ALVORD.
Oil-Still.
No. 213,157.  Patented Mar. 11, 1879.
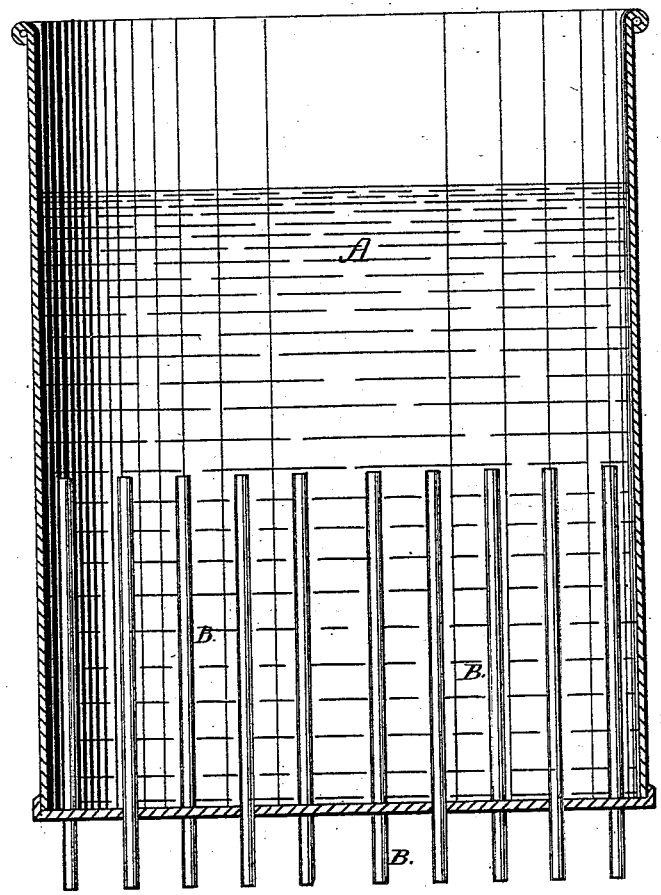
WITNESSES:
W. W. Hollingsworth
Edw. T. W. Byrn
INVENTOR:
C. Alvord
BY
ATTORNEYS.

UNITED STATES PATENT OFFICE.

CLARK ALVORD, OF KENDALL CREEK, PENNSYLVANIA.

IMPROVEMENT IN OIL-STILLS.

Specification forming part of Letters Patent No. 213,157, dated March 11, 1879; application filed January 4, 1879.

*To all whom it may concern:*

Be it known that I, CLARK ALVORD, of Kendall Creek, in the county of McKean and State of Pennsylvania, have invented a new and Improved Oil-Still; and I do hereby declare that the following is a full, clear, and exact description of the same, reference being had to the accompanying drawing, forming part of this specification, in which the figure is a vertical section.

In the distillation of petroleum or other liquid hydrocarbons in stills employing outside fires a very high degree of heat has been necessary, and great care required to prevent burning or coloring the distillate. Such process is also wanting in rapidity after the most volatile of the vapors have passed off, which has involved a further addition to the heat. There has consequently been not only a great loss of time and expenditure of fuel necessary, but the intense heat, combined with the absence of motion in the heavy liquids in the stills as the distilling process approaches conclusion, has produced coke, and caused a crust to form on the bottom of the still. This is very destructive to the still, as it involves frequent scraping, and, unless repeatedly attended to, it retards distillation.

Various expedients and devices have been resorted to by way of avoiding these difficulties. Thus, some refiners have used mechanical agitators, others movable stills, others heating by superheated steam; others, again, have distilled *in vacuo*, and others have introduced jets of steam, which impinge inside of the still, against the bottom of the same, to agitate and heat the liquid and produce currents in the oil. All these methods have their objections, and the old plan of heating a plain still by a fire beneath its bottom still continues to be used on account of its simplicity.

My invention permits the plain and old form of still to be used, and simply provides means for obviating the objections incident to the same.

The improvement consists simply of a series of metal rods arranged permanently in the bottom of the still and projecting through the same, so as to be heated directly by the fire below, and projecting up into the oil in the body of the still. These rods are made of copper or other good conductor of heat, and they serve in this connection to take the heat from the fire and the bottom of the still, and distribute it through the body of the oil to hasten its distillation by increasing the heating-surface, and for the further and more important purpose of producing upwardly-moving currents in the thick oil, which toward the end of the process becomes so thick that currents from connection cease to circulate. The increased heat employed ordinarily at this stage of the operation to force the distillation only burns the tar upon the bottom of the still, thereby wearing out the still rapidly.

By means of the rods which protrude through the bottom for direct exposure to the heat I am enabled, first, by the greater conductivity of the same, to conduct away from the bottom of the still the excessive heat that would have a tendency to burn the same, thus permitting a much higher degree of heat to be employed with useful effect; secondly, I increase the heating-surface, and in distributing the heat more uniformly through the oil hasten the process of distillation even from the start; thirdly, the hot vertical rods produce in the columns of oil adjacent to the same rising currents, which stimulate or supplement the circulation due to connection, and cause new portions of the oil to be successively brought in contact with the bottom of the still to scour the same of deposits, and to rise to the top, so as to more freely liberate the gas, said circulation being promotive of a freer liberation of the vapor which constitutes the distillate. These rods, it will be seen, may be placed in any old still with but little expense, to render it capable of securing all the benefits of my invention.

In the drawing, A represents—without regard to any particular form, location, or manner of setting—an oil-still; and B are the rods rising in the still, preferably from two to three feet, and descending below the bottom of the same, and projecting preferably from six to eight inches into the fire-space. These rods may, however, have no sensible projection below the bottom of the still, but may have their faces or ends flush with said bottom.

The essential feature of direct exposure to the fire, however, should be preserved. These rods are preferably made of copper, since this metal has the greatest property for conducting heat consistent with its cost. In fitting said rods to their places the bottom of the still may be tapped and the rods screwed in, or otherwise conveniently inserted. They are designed to be from one to two inches in diameter, and are placed at such distances apart as may be found desirable; but they should preferably be placed about a foot apart, or such distance as will permit the workman to enter and make use of a cleaning-tool between the same without disturbing their permanent connection with the bottom.

By means of these rods it will be seen that I am both enabled to make use of the old form of still, which is desirable for many reasons, and at the same time to obviate the objections incident to its use.

An important feature which distinguishes my invention from the incidental conductivity of tubes that rise above the surface of the oil is that a highly-heated metal body which rises above the level of the oil burns the vapor and colors the distillate.

My rods, it will be seen, are always submerged, and never rise to the surface of the oil where they come in contact with the vapors, and hence do not involve this objection.

Having thus described my invention, what I claim as new is—

The combination, with an oil-still, of a series of metal rods fixed in the bottom of the same and extending up into the body of the oil, substantially as described, and for the purpose set forth.

The above specification of my invention signed by me this 3d day of January, 1879.

CLARK ALVORD.

Witnesses:
 EDWD. W. BYRN,
 SOLON C. KEMON.